United States Patent [19]

Bergstrom

[11] 4,211,440

[45] Jul. 8, 1980

[54] COMPENSATED BLAST JOINT FOR OIL WELL PRODUCTION TUBING

[76] Inventor: Arthur E. Bergstrom, 5410 Bergstrom La., Houston, Tex. 77088

[21] Appl. No.: 756,251

[22] Filed: Jan. 3, 1977

Related U.S. Application Data

[63] Continuation-in-part of Ser. No. 600,616, Jul. 31, 1975, Pat. No. 4,141,386.

[51] Int. Cl.² ........................................... F16L 55/00
[52] U.S. Cl. ...................................... 285/45; 138/147; 166/243; 285/333
[58] Field of Search .......................... 285/45, 333, 334; 166/243; 138/147, 155

[56] References Cited

U.S. PATENT DOCUMENTS

| | | | |
|---|---|---|---|
| 2,532,632 | 12/1950 | MacArthur | 285/333 X |
| 2,653,294 | 9/1953 | McMillan, Jr. | 285/333 X |
| 2,925,097 | 2/1960 | Duesterberg | 166/243 X |
| 3,365,000 | 1/1968 | Arnwine | 166/243 |
| 3,382,930 | 5/1968 | Ribb et al. | 166/243 X |
| 3,904,211 | 9/1975 | Dega | 277/32 |
| 3,995,665 | 12/1976 | Monaghan | 138/147 |

Primary Examiner—Thomas F. Callaghan
Attorney, Agent, or Firm—George F. Lee

[57] ABSTRACT

Means is provided in a blast joint, for an oil well, whereby the elements of the blast joint are designed and organized to overcome adverse external conditions encountered in the installation of the joint, as well as those encountered in the operation of the joint in the well, to maintain the structure and operability of the blast joint in a condition favorable to its effectiveness in protecting the production tubing from erosion at its production location in the well.

6 Claims, 8 Drawing Figures

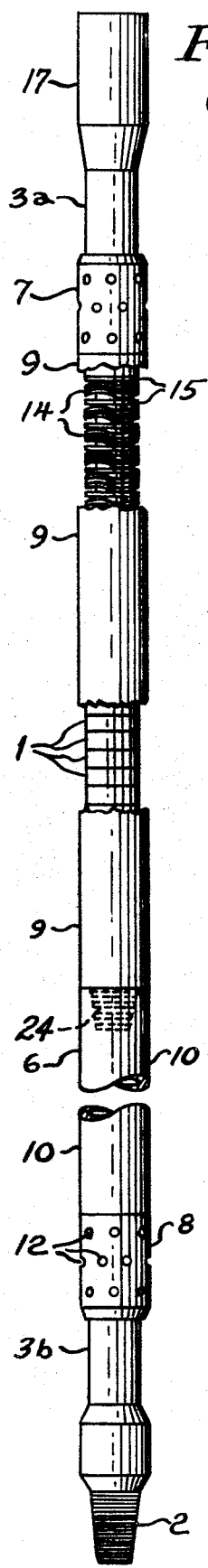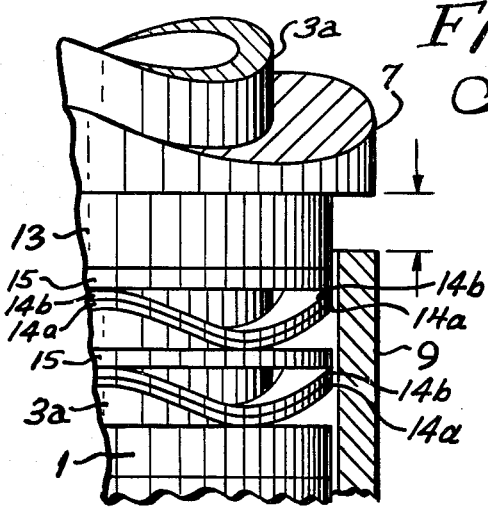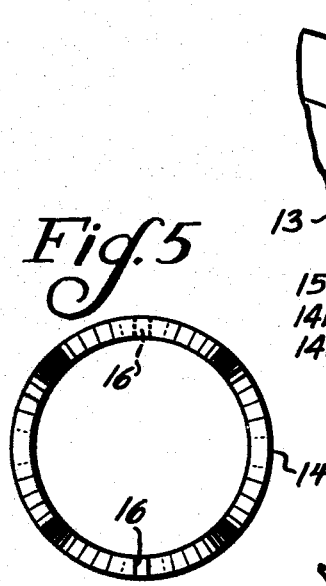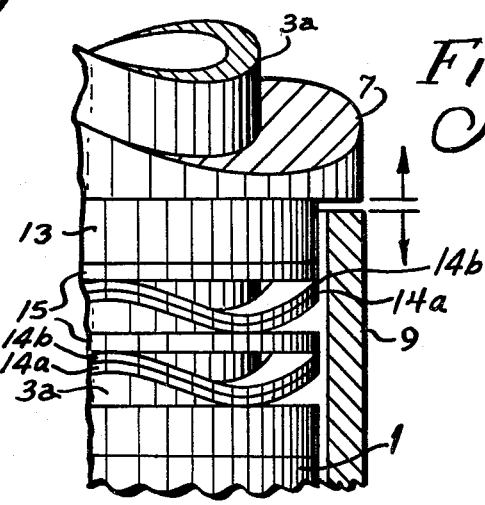

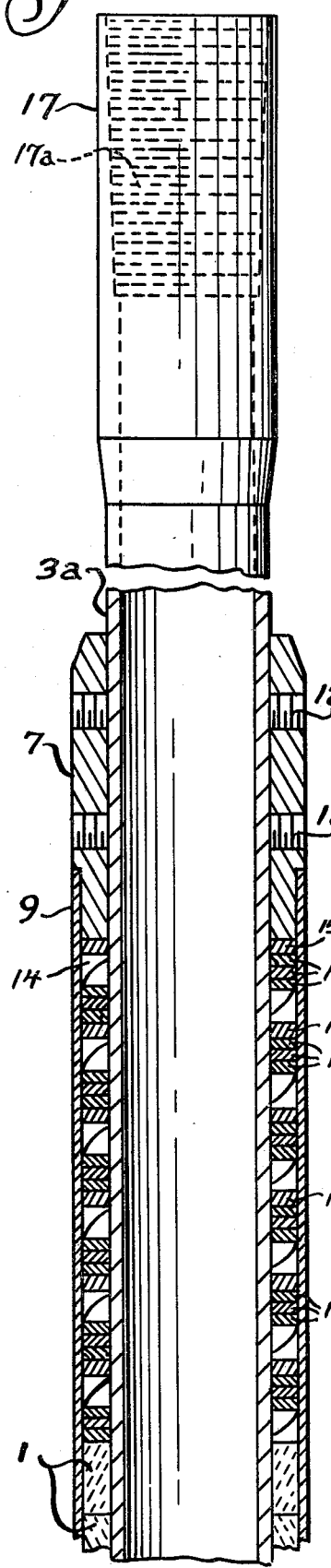
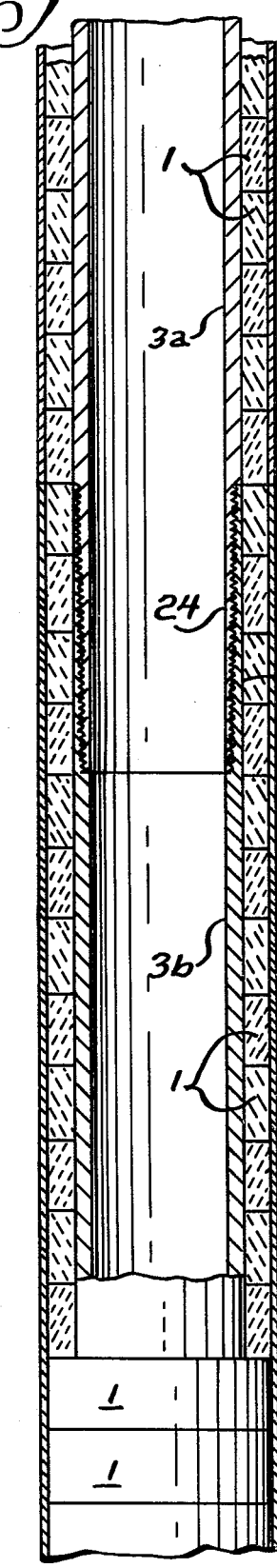
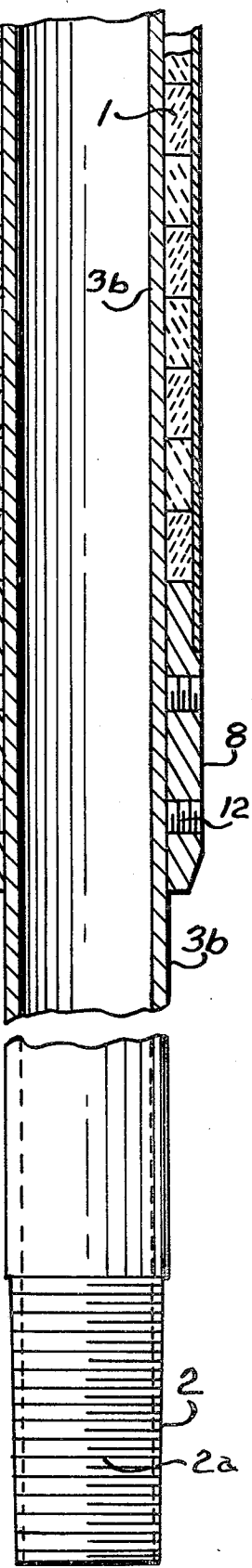

4,211,440

COMPENSATED BLAST JOINT FOR OIL WELL PRODUCTION TUBING

CROSS REFERENCE

In my co-pending application Ser. No. 600,616, filed July 31, 1975, now U.S. Pat. No. 4,141,386 I disclose the concept of utilizing short (for example, about one inch long axially) rings of heavy metal carbide strong axially end to end upon a suitable length of A. P. I. American Petroleum Institute production tubing, serving to prevent abrasion or erosion of the production tubing by interposing the shielding of the carbide rings. The present invention develops that concept and embodies it in a commercial product.

SUMMARY OF THE INVENTION

In the course of operations in the field it became apparent that the production of a successful carbide blast joint to protect the production tubing from erosion was dependent upon developing a practical means for protecting the carbide rings from injury by the mechanical forces developed in handling and entering of the blast joint into the string of production tubing in the well. The original concept of fixing the carbide rings end to end in a fixed position on the production tubing involving the blast joint, required modification to the extent of allowing sufficient freedom of endwise and/or angular motion of the carbide rings relative to the underlying tubing as to permit the required stressing and distortion involved in handling of the completed blast joint in assembling, shipping and in particular in the installation of the blast joint in the string of production tubing, and lowering of the same into the well.

THE PROBLEM

The overall problem of the invention is to provide protection to the production tubing where it is encountered by abrasive blasts or currents of gas or liquid in the well and to effect said protection by shielding such part with protective means consisting of carbide rings as per the disclosure of my aforesaid prior application. The successful functioning of the blast joint in the well was found to be significantly dependent upon the preceding handling of the blast joint before it got into the well. In the well the blast joint usually assumes a substantially vertical position with the carbide rings embracing the production tube end to end with respect to each other, snuggled up to each other to prevent penetration by the blast between adjacent carbide rings after the original protective sheath has been abraded or cut away by the blast to the extent of revealing the carbide rings. It was found that the handling of the joint, prior to its installation, could significantly affect the effectiveness of the installed joint if, for example, the carbide rings were not snuggled up to each other but were so positioned as to allow gaps between them. This could, for example, occur in the installation of the blast joint when the blast joint is laid out on the deck of the drilling platform and picked up from the box end by the crane. There is no assurance that the rings will remain snuggled up to each other when they enter the well after having been progressively inclined to the longitudinal axis of the joint along the major part of the length of the joint in the operation of lifting the joint from the horizontal position by picking up the box end and progressive raising the joint from the horizontal position to the vertical position preparatory the lowering the same vertically into the well.

PRIOR ART BACKGROUND

The prior art has attempted to adopt rigid protective materials in the form of brittle sleeves of extensive length, in proportion to their diameter, to protect the production tubing by taking up the difference in flexibility through cushioning material. Such approaches have failed to solve the problem. The protective tubular cover of carbide is segmented, that is, made up of rigid parts having planar end surfaces at right angles to the longitudinal axis, which end surfaces maintain fluid tight contact with each other and maintain the character of a continuous wall consisting of contacting but laterally shiftable square ended blocks.

THE NOVEL CONCEPT

In my copending application Ser. No. 600,616 filed July 31, 1975, I teach the improvement resident in constructing the blast joint of a sheath consisting of encircling carbide rings, approximately one inch long axially, assembled coaxially over a length of standard production tubing. This serves admirably when it is properly installed in the desired condition in the well, in the string of production tubing. This construction provided marked improvement, but I found that in lifting such a string, so constructed, from the platform floor by attaching the crane hook to the box joint end, and raising the joint from the box joint end, some chipping or cracking, of some of the rings was not unknown. The bending of the joint, by its own heavy weight, produced concentrated stresses on the rings.

Heretofore I have produced blast joints comprising a string of short, carbide rings each ring being about one inch long axially strung upon a joint of standard production tubing with end clamping rings fastened by set screws upon the tube to hold the carbide rings closely against each other endwise to minimize access of the blast to the wall of the tube, between such rings. This construction when satisfactorily installed demonstrated the ability of the arrangement to shield the underlying production tubing from abrasive attack.

A difficulty was encountered that where a blast joint of considerable length was picked up from the horizontal position by the crane, preparatory to lowering the joint to attach it to the string in the well, damage in the form of cracking or fracture of one or more rings was occasionally incurred. The cause appeared to be that bending of the string, with the rings held against each other by unyielding clamping rings, compressed the rings on the concave side of the string being lifted from the floor tending to chip or crack or break one or more of the rings or the edges thereof. The rings were sometimes chipped in compression on the concave side because the supporting production tube is in some degree elastic, and with the heavy inelastic rings being held tightly endwise between the end clamping rings and being inflexible they were subjected to high localized compressive stresses, being forced together on the concave side of the bend and tending to be separated from each other on the convex side. While the production tube could stretch and the rings could separate on the convex side to some degree, there was no adequate freedom for shortening of the concave side because the rings occupied the available space and they are literally incompressible and tend to be highly stressed in compression or pinched on very limited areas resulting in a tendency to chipping or breakage of one or more of the rings on the concave side of the string.

I conceived that relief to this situation could be provided by introducing a yieldable compression spring or springs of the type known as wave springs, encircling the tubing and disposed between the end of the array of rings and the endwise clamping ring, or rings, since the joint is picked up by the box end where the bending pressure on the rings starts to be applied as the said end is turned up and lifted. The wave spring in the present assembly yields endwise for lateral bending of the string in any lateral direction.

A compression spring or a plurality of springs in the form of a simple or multiple wave spring was interposed between the upper (next to the box end of the tube) or outermost carbide ring, and the adjacent clamping ring. The unbalanced stress of compression is initiated on the upper side of the uppermost rings when the lifting of that end begins. By providing the wave springs at that location the sharp bending stress on the upper end of the string is relieved by the yielding of the adjacent wave spring. The danger of cracking or chipping was greatly reduced or eliminated.

BRIEF DESCRIPTION OF THE DRAWINGS

FIG. 1 is a side elevational view of a blast joint embodying the invention, with parts broken away to reveal normally concealed parts of an assembled blast joint embodying the present invention;

FIG. 2 is a fragmentary vertical section through the upper part of a blast joint such as shown in FIG. 1 illustrating the initial assembled position of the central production tube, the outer protecting sleeve, and the underlying assembled wave springs with their cooperating flat washers or platform rings slidably embracing the production tube above the protective rings;

FIG. 3 is a view similar to FIG. 2 showing the parts in the position which they take after the compression of the wave springs by depressing the upper collar, and showing attachment of said upper collar in fixed position on the production tube;

FIG. 4 is a view similar to FIG. 3 but shows the parts in stabilized position into which said parts snuggle up to each other longitudinally of the blast joint;

FIG. 5 is a plan view of a complimentary pair of springs constituting a wave spring unit; and FIGS. 6, 7 and 8 are partially fragmented, longitudinally extending vertical sectional views taken through the blast joint along lines 6—6, 7—7 and 8—8 respectively in FIG. 1.

DESCRIPTION OF THE PREFERRED EMBODIMENT

FIGS. 1, 6, 7 and 8 together illustrate the blast joint of my invention in the position which it occupies in a vertical string of production tubing, broken away to reveal normally concealed structure. The joint, as shown in FIG. 1, positionally is located at or adjacent the lower end of a string of production tubing at a point where a high velocity flow of oil, gas and sand may strike the tubing of the production string. The blast joint is interposed to withstand the attack of such blast.

The upper or box end of the joint of FIG. 1 has a coupling terminal portion 17 which has a tapered internal thread 17 (FIG. 6) of standard form, pitch and dimensions, which matches the threading on the pin end 2, which latter has standard taper external threads 2a matching with the cooperating internal threads in the box end 17.

The basic cylindrical portion of the blast joint as a whole is constructed of two sections 3a and 3b produced by cutting a standard length of production tubing into two substantially equal lengths, and joining them by flush or concealed taper threads 24 to produce a flush joint 4 as described in detail in my co-pending application Ser. No. 600,616, filed July 31, 1975. The purpose of the severence of the tube and its later rejoining on the flush joint 4 is to simplify the construction, more particularly to permit assembly of the clamping variously called sleeves or collars 7 and 8 the wave spring units 14 and the carbide rings 1 upon the tube sections 3a and 3b aforesaid.

After the full length joint has been cut into two parts and the adjacent ends screw threaded in order later to form the flush joint 4, the said cut ends are separated and screw threaded and the clamping sleeves 7 and 8 are separated, that is, telescoped endwise from the cut ends towards the box joint end 17 and towards the flat pin joint end 2 respectively. The flat parallel-ended rings 15 with wave spring units 14 therebetween are placed over the end of the tube section 3a.

These short, parallel-ended cylindrical platform rings 15 in a typical installation will have an outer diameter of 2.890 inches and an inner diameter of 2.450 inches both with 0.010 inch tolerance, and of an axial thickness 0.155 inch plus or minus 0.005 inch. Rings 15 are flat washer type rings that is axially short rings that receive the endwise thrust of the wave springs 14, and transmit it axially to the horizontal planar surfaces of the clamping sleeve 7.

The wave springs 14 are assembled in pairs. The wave spring rings are not circularly continuous but are slotted transversely to provide a gap 16 of approximately one quarter inch to allowing for contraction and expansion axially under pressure and relief therefrom. The cuts 16 in the wave spring rings 14a and 14b are 180° out of register, as illustrated in FIG. 5. The springs 14a, 14b are nested together in pairs with the respective circumferential gaps 16 out of register, angularly 180°. With each pair of said rings 14a, 14b there is assembled a flat stiff platform ring 15. The two platform rings 15 15 and the two-ply wave spring 14a—14a comprise a cooperative unit. The wave springs 14a–14b with their associated platform 15 constitute units of the desired number (six are illustrated in FIG. 1) strung upon the production tube 3a, 3b loosely, with the platform washer 15 of the terminal unit engaged by the associated cylindrical reduced end 13 of the adjacent clamping collar 7.

In FIGS. 2, 3 and 4 of the drawings, two sets of wave springs 14a, 14b, with washers serving as platform rings 15 are illustrated. FIGS. 1, 6, 7 and 8 six sets of wave springs and platform rings are illustrated. The outer cylindrical protective sheath sleeves 9, 10 telescope with cylindrical extensions 13 on each of the clamping sleeves 7 and 8. The sheath tube which in two sections 9, 10, embraces the cylindrical ends 13,13 of the clamping sleeves 7, 8, completes an enclosure for the wave springs, allowing room for play, (see FIG. 2) due to thermal expansion and contraction of the parts, while maintaining the enclosure for the carbide rings 1 and the wave springs, and allowing for some bending of the joint as a whole during handling as aforesaid.

In the drawings FIG. 2 shows the position of the clamping sleeve 7, the wave spring units 14a, 14b and the carbide rings relative to each other at the upper end of the joint. The wave springs and their associated washers, or platform rings are located at the upper end of the blast joint to take up endwise expansion due to temperature increase, and bending and handling of the blast joint.

The blast joint above described is produced by first cutting a suitable length of production tubing, then forming a flush threaded joint between the ends which have been severed. But before assembly of the two sections, the clamping sleeves 7 and 8 are strung upon the sleeve sections and moved toward the respective threaded outer ends of the tube sections. The rings 1,1 are then strung upon the tube sections. Thereupon the clamping sleeve 7 and 8 are moved toward each other to their relative innermost positions. The wave springs 14a–14b and their cooperating washers 15—15 are pressed downwardly by clamping sleeve or collar 7 which is then retained by tightening the set screws 12 therein against the production tube section 3a. The wave spring unit 14 consists of two similar annular, slotted individual springs 14a, 14b superposed with the slots 16 diametrically disposed, one slot thereby facing up and its companion facing down in the assembly whereby the wave springs are axially compressible and expansible between balanced parallel annular surfaces such as are presented by clamping collar 7 (extension 13) the platform or washers 15 on one side and the upper carbide ring 1 platform or a metallic washer 15 inserted at that point.

FIG. 1 illustrates the blast joint of my invention in the position which it occupies in a vertical string of production tubing. The upper or box end of the joint of FIG. 1 has a coupling box thread of standard form, pitch and dimensions which matches the threading, pitch and dimensions on the pin end 2, of the adjacent tube section (not shown) and is standard with the external production tubing of the same diameter. The threading on the pin end 2 of the blast joint has standard external internal threads matching with the threadsin the box 1 and with similar tubing threads.

The basic cylindrical body portion 3a–3b of the blast joint as a whole is constructed of two sections produced by cutting a standard length of production tubing in substantially equal parts and threading them with taper threads to produce a flush joint 4 as described in my co-pending application Ser. No. 600,616, filed July 31, 1975. The purpose of the severence of the tube and its later rejoining by the flush joint 4 is to simplify the construction and assembly of the wave springs and their cooperating carbide rings.

After the sections 3a and 3b have been produced by cutting the full length tube into sections and cutting threads on the adjacent ends to produce the flush joint 4 the wave springs and their cooperating platform washers 15 are assembled adjacent the upper clamping sleeve 7. After the wave springs and their washers 15 and the appropriate number of carbide rings 1 are assembled on the joined tube sections the sheath tubing sections 9 and 10 are telescoped over the same and the production tube sections are screw threaded together on the flush joint 4. The sheath tubing sections 9 and 10 are applied before the flush joint 4 is assembled. This is permitted by the initial disposition of the clamping sleeves or collars 7 and 8 in their maximum outward positions. The lower clamping sleeve or collar 8 with its clamping screws 12 is then moved axially to bring the sheath sections 9 and 10 into contact where they are joined endwise by welding. The set screws 12 in the collar 8 secure the collar to the tubing section 3b.

The upper clamping collar 7 is guided on its inner cylindrical walls on the production tube 3a and it has an integral, cylindrical, guiding section 13 which extends into and is guided in the upper end of the sheat tubing 9 as may be seen in FIGS. 2, 3 and 4.

The upper clamping sleeve or collar 7 (see FIGS. 2, 3 and 4) has a reduced diameter extension 13 which extends into the upper end of the cylindrical outer protective tubing 9,10 (see FIGS. 3, 4 and 5) the function of which tubing is largely to maintain a smooth, outer surface of the assembled carbide rings 1 and to provide a smooth inner surface for guiding the play of the wave springs.

PLACING THE BLAST JOINT

The blast joint above described is manufactured at a location generally remote from the well where it is to be placed and put to use.

In general the blast joint constructed as above described will be enclosed in a casing in which it will be delivered to the well head and from which casing in horizontal position, i.e. from the floor of the drilling platform, the blast joint is raised by the platform crane. The crane hook will be attached to the box end 17 and the joint will be progressively raised from horizontal position to vertical position. The bending stress to which the blast joint will be subjected would tend to compress on one (upper) side and stretch on the other (lower) side. By the introduction of the wave springs as above described the stresses are distributed and greatly reduced and chances of injury reduced or avoided. The sections 9–10 of the external sheath tube are protective of the carbide rings in two ways, first in being welded together into a continuous outer shell they assist in distributing the bending stresses and thereby avoiding or reducing sharp bending stresses. In addition they furnish full length protection against injury to the joint by shielding the individual rings against any sharp impact which may occur in the course of handling or installation. Since any injury at the well head is generally not repairable by the crew or tools there present, the improvement in the utility of the invention by the avoidance of possible injury is highly significant.

I claim:

1. A carbide-sheathed blast joint comprising a length of oil well tubing having threaded opposed ends,
    a series of axially short carbide rings embracing said tubing between its ends, said carbide rings each having parallel opposed end surfaces which are continuously planar from their inner periphery to their outer periphery and are at right angles to the longitudinal axis of the tubing, the end surfaces of said carbide rings being in contiguous relation, and,
    a wave spring embracing said tubing at one end of said series of carbide rings,
    a first clamping collar fixed about said tubing at one end thereof against which the other end of said series of carbide rings engages, and
    a second clamping collar fixed about said tubing at the other end thereof which holds the wave spring in compression therebetween and the carbide rings to maintain the end surfaces of the carbide rings in close contiguous relation,
    said wave spring being yieldable axially in response to endwise and angular motions of the carbide rings so as to accomodate stretching and flexing of the tubing at down hole positioning and temperature.

2. The combination of claim 1 wherein the wave spring comprises two discontinuous circular thin spring rings in contact in an axial direction with each other disposed between the clamping collar and the adjacent end of the series of carbide rings, said circular thin spring rings being transversely slotted each by a single slot and said slots being diametrically oppositely disposed with respect to each other.

3. The blast joint of claim 1 wherein a plurality of wave springs are mounted in sets on said tubing and flat rings embracing said tubing are mounted between adjacent sets of wave springs.

4. A carbide-sheathed oil well blast joint comprising a production tube having an internally threaded box joint at one end and an externally threaded screw joint at the other end, said blast joint comprising two sections of production tubing of approximately equal length joined end to end by a screw threaded flush joint, a plurality of axially short carbide rings of oblong rectangular cross section each having parallel opposed end surfaces at right angles to the longitudinal axis of the tube sections which end surfaces are continuously parallel from their inner to their outer periphery, said carbide rings being slidably mounted about said production tubing sections and extending in an assembled group in contact with each other from adjacent the screw threaded pin joint to adjacent the box joint, a slideable clamping collar adjacent each one of the free ends of the joined sections comprising a first clamping collar mounted on the tube adjacent the pin joint and a second clamping collar mounted on the tube adjacent the box joint, said carbide rings being slideably mounted on the tube between said first and second clamping collars, and a multiple wave spring embracing the tube adjacent the box joint end between the first collar and the adjacent end of the string of carbide rings, said first clamping collar being endwise adjustable along the production tube to engage and hold the wave spring in compression therebetween and the carbide rings, adjacent ends surfaces of the carbide rings being maintained by the wave spring under yieldable endwise pressure in contact with each other, the multiple wave spring yielding axially in response to endwise and angular motion of the carbide rings to accomodate stretch and flexing of the tube at down hole position and temperatures.

5. A carbide-sheath blast joint comprising a length of oil well tubing,
collars embracing said tubing and fixed thereto adjacent each end thereof,
a series of contiguous abrasion-resistant carbide rings co-axially mounted on said tubing between said collars,
said carbide rings being of uniform oblong rectangular cross section and each having an axial length not substantially greater than one inch,
the end walls of said carbide rings being disposed planar and parallel continuously from their inner to their outer peripheries, and
a set of discontinuous annular wave springs embracing said tubing and held in compression between one said collar and the nearest carbide ring, so as to maintain the carbide rings with their end surfaces in close contact,
said wave spring being transversely slotted each by a single slot which allows for contraction and expansion, and
the carbide rings being maintained by said wave springs in contact with each other and under yieldable endwise pressure to accomodate stretching and flexing of the tubing at down hole positioning and temperatures.

6. A blast joint as claimed in claim 5 wherein the wave springs are assembled with their slots out of register.

* * * * *